(12) United States Patent
McCormick et al.

(10) Patent No.: US 6,519,455 B1
(45) Date of Patent: Feb. 11, 2003

(54) APPARATUS, METHOD AND SYSTEM FOR HANDOFF OF A MOBILE BROADCAST OF INFORMATION SPECIFIC TO A GEOGRAPHIC REGION

(75) Inventors: Mark Alan McCormick, Naperville, IL (US); Leslie Joseph Williams, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/473,162

(22) Filed: Dec. 28, 1999

(51) Int. Cl.⁷ .................................................. H04Q 7/20
(52) U.S. Cl. ........................ 455/438; 455/436; 455/439
(58) Field of Search ................................ 455/436, 438, 455/439

(56) References Cited

U.S. PATENT DOCUMENTS

| | | | | |
|---|---|---|---|---|
| 5,574,977 A | * | 11/1996 | Joseph et al. | 455/58.1 |
| 5,761,623 A | * | 6/1998 | Lupien et al. | 455/552 |
| 5,857,153 A | * | 1/1999 | Lupien | 455/422 |
| 6,097,962 A | * | 8/2000 | Corriveau et al. | 455/466 |

\* cited by examiner

*Primary Examiner*—Thanh Cong Le
*Assistant Examiner*—Tuan Tran
(74) *Attorney, Agent, or Firm*—Nancy R. Gamburd (57) ABSTRACT

An apparatus, method and system are provided for a handoff of a mobile broadcast of information specific to a geographic region. The mobile broadcast is typically transmitted on a first broadcast channel from a serving switching center and a serving transceiver to a mobile unit, such as to a cellular telephone. The preferred system includes a plurality of mobile switching centers coupled via signaling and trunk lines to a plurality of transceivers. The serving switching center selects a target switching center and transmits a handoff directive, the handoff directive including a broadcast parameter designating the mobile broadcast. In the preferred embodiment, the broadcast parameter is an eight bit designation of the broadcast channel, and may be included within a field of ANSI-compatible messages, such as Facilities Directives and Handoff Measurement Requests, and distinguishes the handoff of the information broadcast from other types of communication handoffs. The target switching center determines a second broadcast channel providing an information broadcast feature in a second geographic area served by the target switching center and a target transceiver. Via the serving transceiver, the serving switching center directs the mobile unit to the second broadcast channel.

31 Claims, 6 Drawing Sheets

APPARATUS, METHOD AND SYSTEM FOR HANDOFF OF A MOBILE BROADCAST OF INFORMATION SPECIFIC TO A GEOGRAPHIC REGION

CROSS-REFERENCE TO A RELATED APPLICATION

The present invention is related to McCormick et al. U.S. patent application Ser. No. 09/200,333, entitled "Apparatus, Method And System For Mobile Broadcast Of Information Specific To A Geographic Region", filed Nov. 25, 1998, commonly assigned to Lucent Technologies, Inc. and incorporated by reference herein, with priority claimed for all commonly disclosed subject matter (the "related application").

FIELD OF THE INVENTION

The present invention relates in general to telecommunication systems, and more particularly, to an apparatus, method and system for handoff of a mobile or wireless broadcast of information specific to a geographic region or locality.

BACKGROUND OF THE INVENTION

Commuters and travelers often receive radio broadcasts for a large, metropolitan area. These broadcasts may contain information pertinent to such an entire metropolitan area, such as traffic reports during rush hour. These traffic reports, however, typically cover an entire metropolitan area, and are only available during specific broadcast intervals, such as every ten minutes. Such information is also typically very general, and may not specifically pertain or apply to the precise area in which the commuter or traveler is currently, at that moment in time.

A typical broadcast in the greater Chicago metropolitan area, for example, may include general traffic information for portions of freeways and highways in and out of downtown Chicago, along with information pertaining to traffic along highways in the suburbs and the greater tri-state area. Other geographic areas within the broadcast region of metropolitan Chicago, however, may not receive any information specifically pertinent to their geographic region. For example, a commuter in Gary, Ind. will typically receive Chicago traffic information, not traffic information relevant to the stretches of highway within the city of Gary.

In addition, such information is typically quite general, and does not include information for smaller geographic regions. For example, a commuter may want to know that traffic along a local main road is particularly slow, whereas this information is completely irrelevant to a commuter as little as a few miles away.

The related application discloses an apparatus, method and system to provide or broadcast information to a given geographic region, in which the information is also specific to that geographic region. Such information may include geographically specific information such as traffic reports, sightseeing interests, weather conditions, or any other information specific to the local geographic region. Such an apparatus, method and system should also provide different or varying information from region to region.

As a mobile unit traverses a geographic region while receiving such an information broadcast, a need may arise to handoff the broadcast session from one mobile switching center and/or transceiver to another mobile switching center and/or transceiver. As a consequence, a need remains to provide an apparatus, method and system for such handoffs of information broadcasts to mobile units. In addition, such an apparatus, method and system should be user friendly, user transparent, cost effective, and capable of implementation in existing communication systems.

SUMMARY OF THE INVENTION

In accordance with the invention disclosed in the related application, geographically specific information is broadcast over specific channels within a specific geographic region, such as within the broadcast region of a specific cellular transceiver. Such information will, in general, vary from region to region, and will vary over time. When accessed, such information is broadcast to mobile units, such as cellular telephones, which are within the given region at any given time. Such access and broadcast are preferably user initiated, by the user dialing a specific sequence or number designated by the service provider for this particular type of service.

In accordance with the present invention, specific handoff procedures for mobile information broadcasts are provided, as a mobile unit may traverse multiple geographic regions and receive different and varied information during any particular broadcast session. In addition, depending upon whether a given geographic region provides such a broadcast, a hand-off procedure may not occur, with the broadcast channel retained by the current transceiver and mobile switching center.

A new parameter, referred to herein as a "broadcast parameter", is utilized to designate that an information broadcast is to be handed off, to distinguish a broadcast handoff from a conventional communication session handoff. In the preferred embodiment, the broadcast parameter is defined as an octet (8 bits), which may be included as a new field within ANSI-compatible messages, and may have a value of zero to 255. In particular, as discussed in greater detail below, the broadcast parameter is utilized preferably in four types of ANSI messages, including Handoff Measurement Requests, Facilities Directives, Handoff Back messages, and Handoff to Third messages.

The preferred system includes a plurality of mobile switching centers coupled via signaling and trunk lines to a plurality of transceivers. The mobile broadcast is typically transmitted on a first broadcast channel from a serving switching center and a serving transceiver to a mobile unit, such as to a cellular telephone. The serving switching center selects a target switching center for the handoff of the broadcast session, preferably by transmitting a Handoff Measurement Request that includes a broadcast parameter, and receiving corresponding Handoff Measurement Request Return Results. The serving switching center then transmits a handoff directive that also includes the broadcast parameter designating the mobile broadcast. The handoff directive may be a Facilities Directives, a Handoff Back message, or a Handoff to Third message. The target switching center determines a second broadcast channel providing an information broadcast feature in a second geographic area served by the target switching center and a target transceiver. Via the serving transceiver, the serving switching center directs the mobile unit to the second broadcast channel.

Numerous other advantages and features of the present invention will become readily apparent from the following detailed description of the invention and the embodiments thereof, from the claims and from the accompanying drawings.

DETAILED DESCRIPTION OF THE INVENTION

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system to provide for a handoff of a broadcast of information that is specific to a given geographic region. The apparatus, method and system in accordance with the present invention provide for such handoffs of these information broadcasts. Such information within the broadcasts may include geographically specific information such as traffic reports, sightseeing interests, weather conditions, tourist information (such as locations of hotels, restaurants, subway and bus stops, restrooms, police stations), local commercials, or any other information specific to the local geographic region, and different or varying information may be broadcast from region to region. In addition, the apparatus, method and system of the present invention are user friendly, user transparent, cost effective, and capable of implementation in existing communication systems.

As discussed in greater detail below, such geographically specific information is broadcast over specific channels within a specific geographic region, such as within the broadcast region of a specific cellular transceiver. Such information will, in general, vary from region to region, will vary over time, and may be updated or modified readily and quickly. When accessed, such information is broadcast to mobile units, such as cellular telephones, which are within the given region at any given time. Such access and broadcast are preferably user initiated, by the user dialing a specific sequence or number designated by the service provider for this particular type of service.

In accordance with the present invention, specific handoff procedures are also provided, as a mobile unit may traverse multiple geographic regions and receive different and varied information during any particular broadcast session. In accordance with the preferred embodiment, a new, eight bit (octet) parameter, referred to herein as a broadcast parameter, is defined to designate that a mobile information broadcast is to be handed off, rather than a handoff of a conventional communication session. While such handoff procedures for an information broadcast are new and independent from standardized handoff procedures, the handoff methodology of the present invention is compatible with the specifications of the American National Standards Institute ("ANSI"), and the new broadcast parameter may be utilized within ANSI-compatible messages. Also as discussed in greater detail below, the various embodiments of the present invention differ considerably from known cellular systems, among other things, with regard to hand-off procedures as mentioned above, with regard to allowing multiple mobile units to utilize the same broadcast channel, and with regard to muting the reverse channels of such mobile units during such broadcast sessions.

Figure 1:
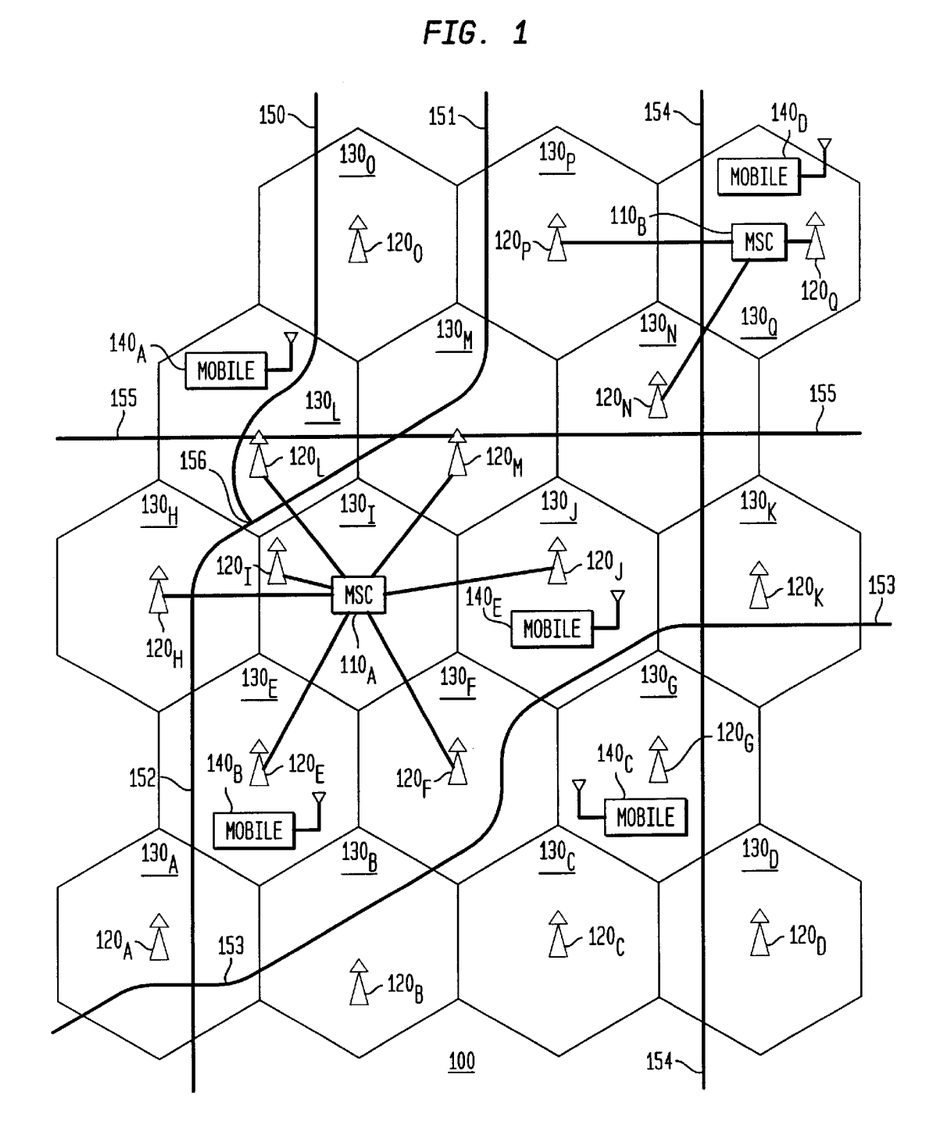
FIG. 1 is a block diagram illustrating a system embodiment in accordance with the present invention.

FIG. 1 is a block diagram illustrating a system 100 embodiment in accordance with the present invention. As illustrated in FIG. 1, the system 100 includes one or more switches 110, such as mobile switching center (MSC) $110_A$ and $110_B$ which are coupled or connected to various transceivers 120, such as mobile transceivers $120_A$ through $120_Q$. Not separately illustrated in FIG. 1, the various MSCs 110 are typically connected between and among each other through various signaling and trunking lines. The various transceivers 120, which may be cellular frequency transceivers, provide wireless communication with various mobile units 140 which are then currently located within the corresponding geographic range, region or sector of each transceiver 120. For example, transceiver $120_L$ may provide wireless communication with mobile unit $140_A$, which is within its geographic broadcast region $130_L$, while transceiver $120_J$ may provide wireless communication with mobile unit $140_E$, which is within its geographic broadcast region $130_J$. Similarly, transceiver $120_E$ may provide wireless communication to mobile unit $140_B$, within its geographic broadcast region $130_E$, while transceiver $120_G$ may provide wireless communication to mobile unit $140_C$ within its geographic broadcast region $130_G$.

In accordance with the present invention, the system 100 provides specific information to each mobile unit 140, which is pertinent to a specific geographic region 130, through a corresponding transceiver 120. For example, utilizing MSC $110_A$, transceiver $120_L$ may broadcast information within its geographic broadcast region $130_L$ pertaining to that particular geographic region. In the event mobile unit $140_A$ accesses or subscribes to that information broadcast, mobile unit $140_A$ will receive information pertinent to the specific geographic region $130_L$, such as traffic information pertaining to intersection 156 and the portions of highway 150, highway 151, highway 152 and highway 155, which are within its geographic region $130_L$. Also utilizing MSC $110_A$, via transceiver $120_J$, mobile unit $140_E$ may receive traffic information pertinent to the portion of highway 153 which is within the geographic region $130_J$. Utilizing MSC $110_B$, via transceiver $120_Q$, mobile unit $140_D$ may receive information pertinent to its geographic region $130_Q$, such as information pertaining to the portions of highway 154 which are within the geographic region $130_Q$.

As discussed in greater detail below, as a mobile unit 140 traverses the various geographic regions 130, a handoff of the broadcast session may be necessary or desirable. Such a handoff may occur among the transceivers 120 connected to the same MSC 110 or among transceivers 120 connected to different MSCs 110. The related application included disclosure or a methodology for handoff of broadcasts among transceivers 120 connected to the same MSC 110. The present invention includes a more widely applicable methodology for handoff of broadcasts among transceivers 120 connected to different MSCs 110 (and may also be equivalently utilized for handoff of broadcasts among transceivers 120 connected to the same MSC 110), as discussed in greater detail below with reference to FIGS. 4 and 5.

Figure 2:
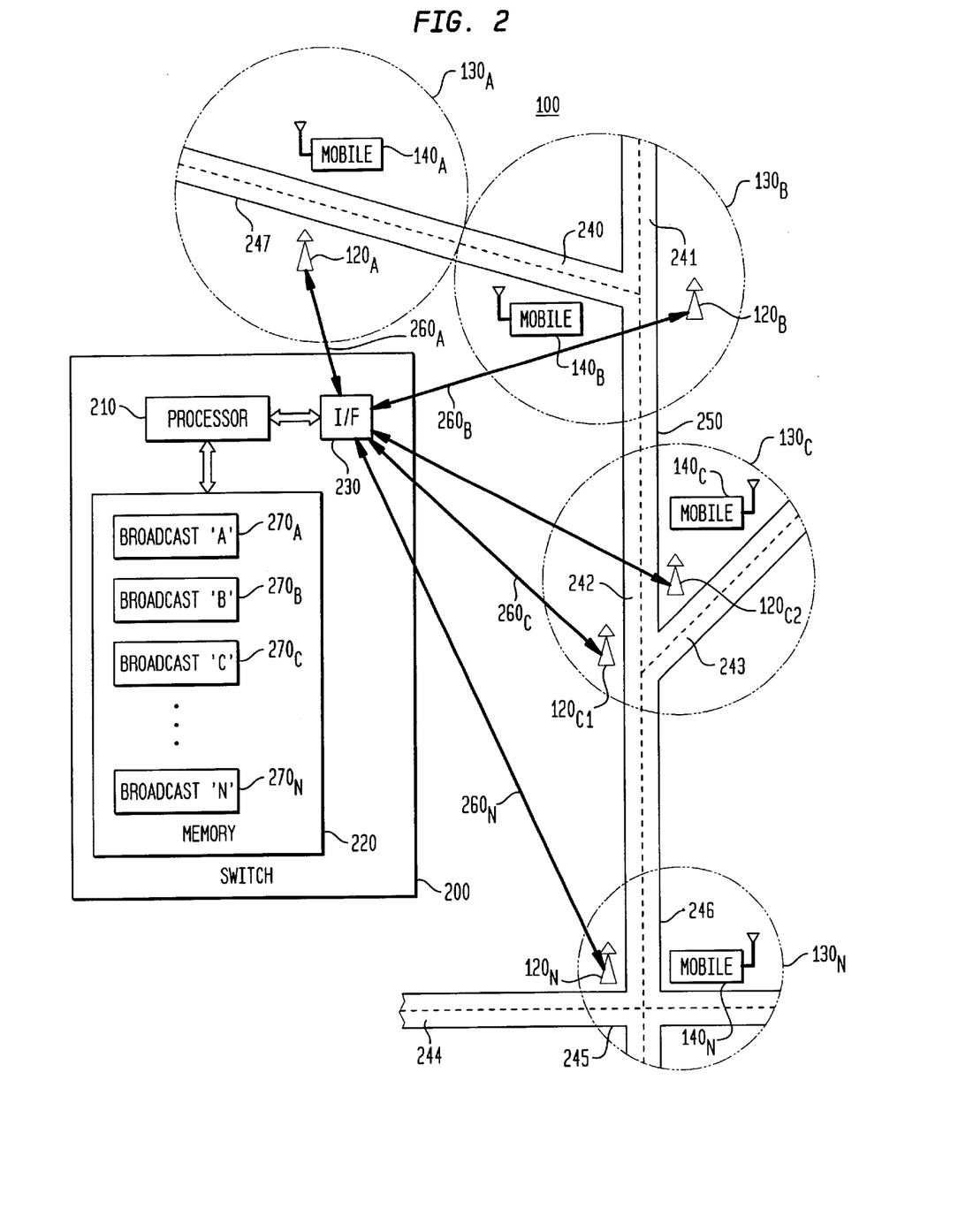
FIG. 2 is a block diagram illustrating, in greater detail, an apparatus and system in accordance with the present invention.

FIG. 2 is a block diagram illustrating, in greater detail, a system 100 and apparatus 200 in accordance with the present invention. As in FIG. 1, the system 100 includes one or more switches 110, illustrated as apparatus 200, and one or more transceivers 120 (coupled to such switches (MSCs)

110 via trunk lines 260). The apparatus 200, such as a switch or MSC 110, includes a processor 210, a memory 220, and a network (or system) interface 230. Through the network interface 230, the apparatus 200 (or MSC 110) is couplable or connected to various transceivers 120, such as transceivers $120_A$ through $120_N$, via communication lines such as trunks $260_A$ through $260_N$. In lieu of being embodied within a switch 110, the apparatus 200 may also be a stand-alone device, or may be incorporated elsewhere within the system 200, such as within or couplable to one or more transceivers 120, or may be distributed between or among a switch 110 and a transceiver 120.

Continuing to refer to FIG. 2, the processor 210 may include a single integrated circuit ("IC"), or may include a plurality of integrated circuits or other components, connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or an arrangement of processors, microprocessors, controllers or some other grouping of integrated circuits which perform the functions discussed above and also discussed in detail below with reference to FIGS. 3, 4 and 5, with associated memory, such as microprocessor memory or additional RAM, ROM, EPROM or $E^2$PROM. The methodology of the invention, as discussed above with reference to FIG. 1, and as discussed below with reference to FIGS. 3, 4 and 5, may be programmed and stored, in the processor 210 with its associated memory (or also memory 220) and other equivalent components, as a set of program instructions for subsequent execution when the processor 210 is operative (i.e., powered on and functioning).

For information broadcasts that are individually specific to each of the various regions 130, such as regions $130_A$ through $130_N$, the memory 220 stores information for broadcasts specific to each such geographic region 130, illustrated as broadcast channels 270, namely, BROADCAST$_A$$270_A$, BROADCAST$_B$$270_B$, BROADCAST$_C$$270_B$ through BROADCAST$_N$$270_N$ in memory 220. Depending upon local conditions specific to each such geographic region 130 or sector within each geographic region 130, each such broadcast channel 270 is potentially and likely to be varied and different from each of the other broadcast channels 270. In addition, a geographic region 130 may have multiple transceivers 120, with each transceiver 120 broadcasting within a sector of the geographic region, such as transceivers $120_{C1}$ and $120_{C2}$ within region $130_{C3}$; in such case, each such transceiver 120 may be broadcasting different or varied information within its particular sector of the geographic region 130. In other circumstances, various geographic regions 130 may share the same broadcast channel, with the same information broadcast by multiple transceivers 120. Each of these information broadcast channels 270 is or may be regularly updated and changed, to provide current information of potentially changing conditions, such as traffic and weather. In other embodiments, such information may be less variable, such as information pertaining to sightseeing opportunities, local events, along with the other types of information discussed above, such as tourist information.

For example, when broadcast information in memory 220 is traffic information, each of the various geographic regions 130 may receive different or varied information compared to the other remaining geographic regions 130. Continuing the example, via transceiver $120_A$ and trunk $260_A$, mobile unit $140_A$ in geographic region $130_A$ may receive traffic information on the broadcast channel BROADCAST$_A$, such as traffic information pertaining to the portion of a roadway 247 (within region $130_A$). In contrast, over trunk line $260_B$ and via transceiver $120_B$ in region $130_B$, mobile unit $140_B$ may receive information on broadcast channel BROADCAST$_B$, consisting of traffic information pertaining to portions of a roadway 240 and 241 (within region $130_B$). Similarly, mobile unit $140_C$ may receive traffic information pertaining to portions of roadway 242 and 243 within region $130_C$, via broadcast channel BROADCAST$_C$ transmitted via trunk line $260_C$ through transceiver $120_C$. Lastly, mobile unit $140_N$ may receive broadcast information pertaining to traffic conditions on roadways 245 and 246, via transceiver $120_N$ and trunk line $260_N$, as broadcast channel BROADCAST$_N$ may be broadcast within geographic region $130_N$.

As mentioned above, such access and broadcast are user initiated, by the user dialing a specific sequence or number designated by the service provider for this particular type of service, entering a feature code, pressing a particular button, or otherwise providing a notification to the service provider. In addition, specific hand-off procedures are also provided, as a mobile unit may traverse multiple geographic regions and receive different and varied information during any particular broadcast session. As a consequence, for ease of explanation, the methodology of the present invention is divided into three portions, namely, an access and broadcast portion (FIG. 3), an initial handoff portion (FIG. 4), and a secondary handoff portion (FIG. 5).

Figure 3:
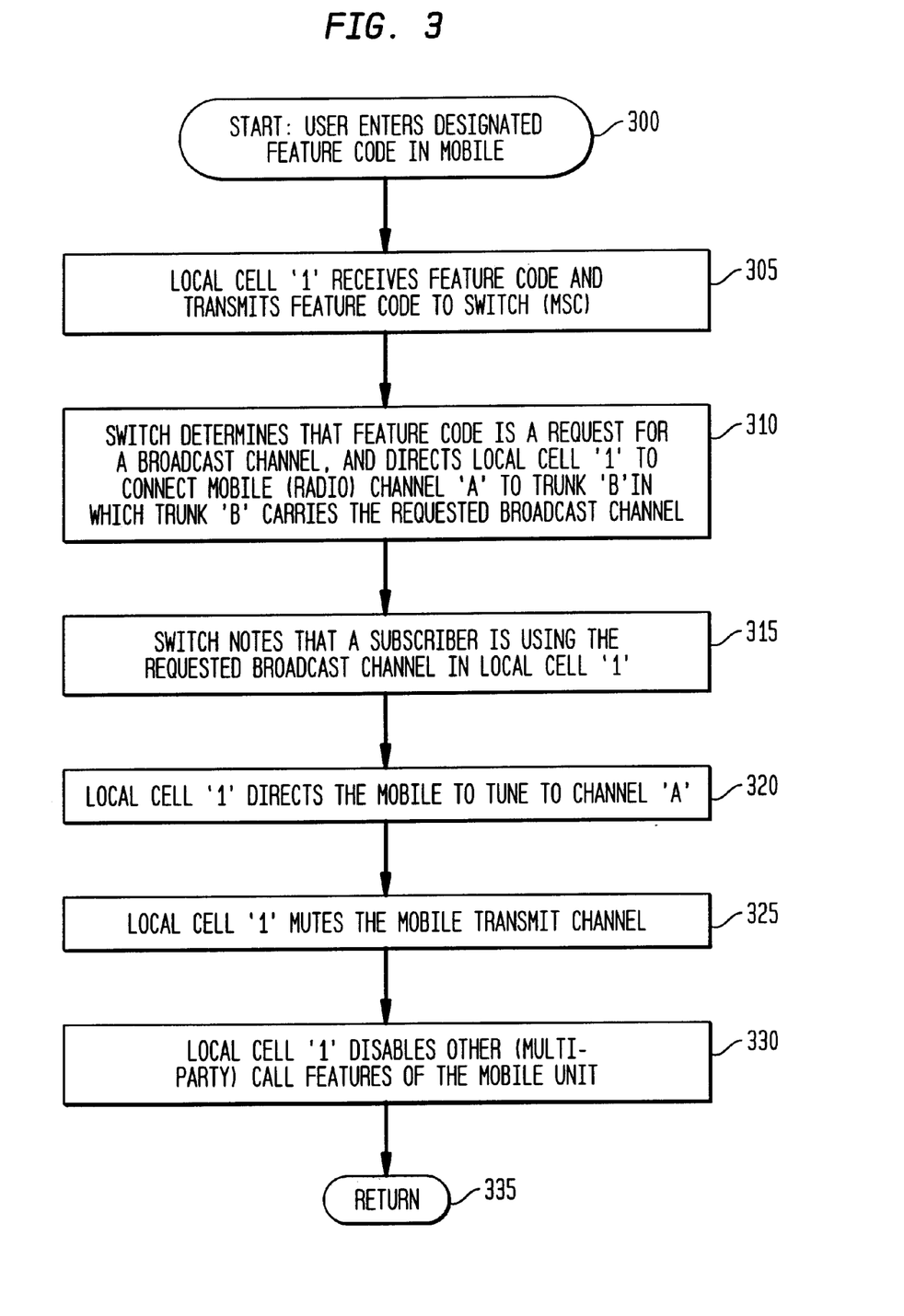
FIG. 3 is a flow diagram illustrating access and broadcast in accordance with the method of the present invention.

FIG. 3 is a flow diagram illustrating a user initiation (or access) and broadcast portion of the method of the present invention. Beginning with start step 300, to access the broadcast information, a user enters a designated feature code (other designated sequence, designated directory number, or particular button) into a mobile unit 140. For example, a user may enter a feature code "*xyz" into their mobile unit 140 to access traffic information, and may enter a predesignated directory number such as "123-abc-defg" into their mobile unit 140 to access sightseeing information. Next, in step 305, the local cell site servicing the particular mobile unit, such as local cell site 1, receives (via a transceiver 120) the feature code from the mobile unit 140 and transmits the feature code to the appropriate switch (MSC 110). In step 310, the switch then determines that the feature code is a request for information over a broadcast channel, and directs the local cell site 1 to connect a mobile (radio) channel A (such as a cellular frequency of an analog system, a time slot of a TDMA system, or a code of a CDMA system) of a transceiver 120 to trunk B, in which the trunk B carries the requested broadcast channel. For example, for an analog system, the mobile (radio or cellular) channel utilized by the local cell site 1 as a broadcast channel is typically at a particular or selected frequency at any given time, to which the mobile unit 140 will be directed to tune, and may be carried by one or more transceivers 120 within the particular cell site, with similar directives for other systems such as TDMA or CDMA. To carry the requested information, that designated mobile broadcast channel (frequency, time slot or code assignment) is connected to the appropriate trunk 260, in this case trunk B, to provide the requested information. In addition, depending upon usage and other matters, the particular channel assignment may be variable, or may be activated or deactivated, at any given time, as discussed in the related application.

Next, in step 315, the switch notes or keeps track that a subscriber is using the requested broadcast channel in the local cell site 1, for possible continued activation or deactivation (discussed in the related application). The local cell site 1 then directs the particular mobile unit 140 to tune to the broadcast channel A, at a particular frequency, time slot or code assignment, step 320. In addition, because multiple users may be utilizing the same broadcast channel to receive the same information, the local cell site 1 also mutes the transmit (or reverse) voice channel of the particular mobile unit 140, step 325, such that the particular mobile user does not interfere with the broadcast channel through an erroneous transmission (but does not mute the transmit (or reverse) message channel). Next, in step 330, the local cell site 1 also disables other call features of the mobile unit 140 that may interfere with the proper reception of the broadcast channel, such as call waiting and other multi-party features. Following step 330, this access and broadcast portion of the method may end, return step 335.

As mentioned above, in accordance with the present invention, it is presumed that different geographic regions 130 serviced by a particular switch (or by other switches) will carry different information on each or many of its various broadcast channels, depending upon the geographic broadcast regions served and other locally varying conditions. As a consequence, when a mobile unit 140 continues to travel and potentially changes geographic regions 130 or changes sectors within a given geographic region 130, such as traveling from region $130_B$ to regions $130_C$ through $130_N$ in FIG. 2, in accordance with the preferred embodiment, that mobile unit 140 may receive different information as it traverses each geographic region 130, depending upon local conditions. To provide for such potentially different information broadcasts as each mobile unit 140 traverses different regions 130, in accordance with the preferred embodiment, specialized hand-off procedures are utilized. These hand-off procedures of the present invention differ from the typical or known hand-off procedures utilized in bi-directional cellular or other mobile communication systems.

Figure 4:
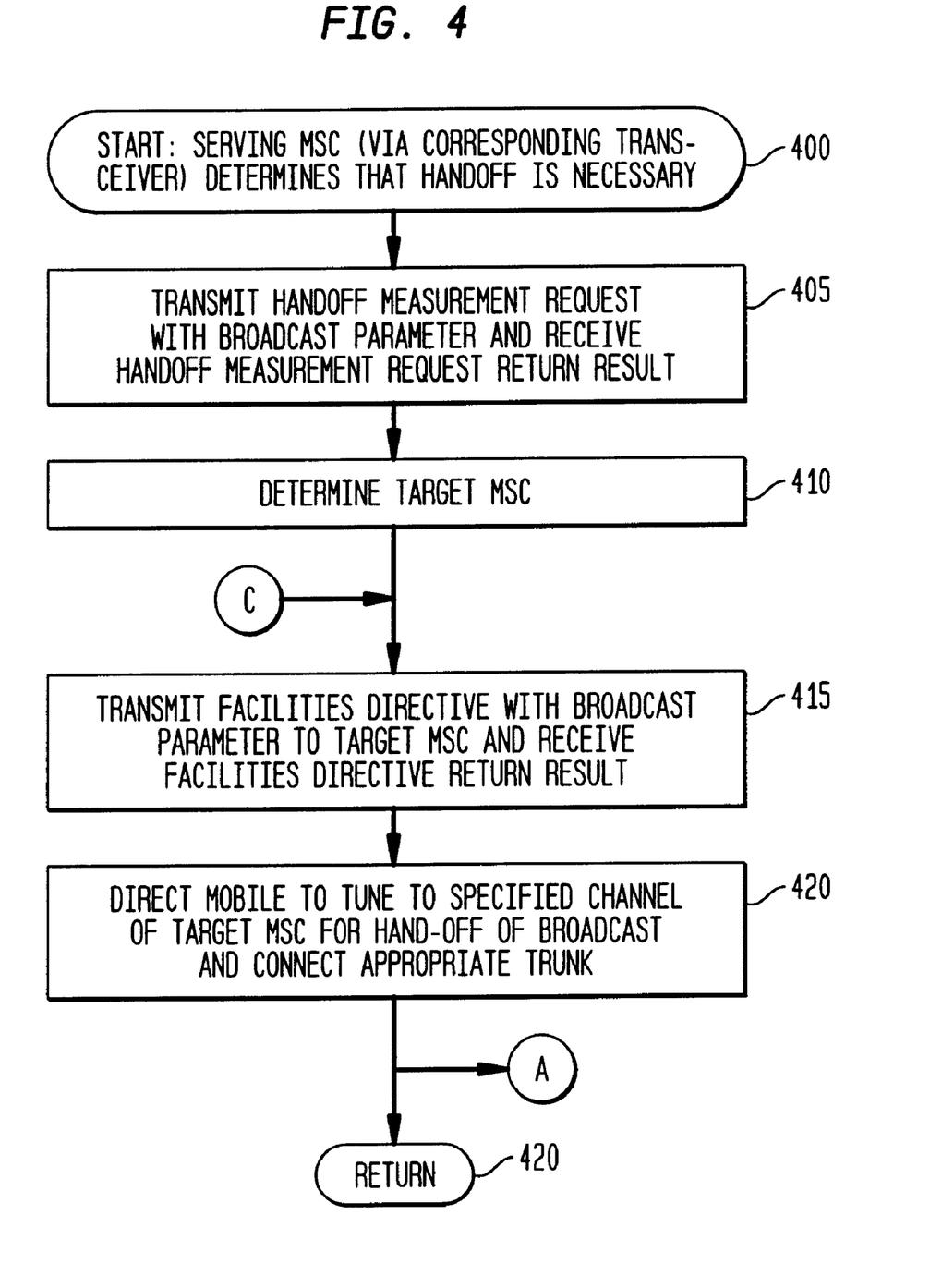
FIG. 4 is a flow diagram illustrating broadcast handoff and corresponding messaging in accordance with the method of the present invention.
Figure 5A:
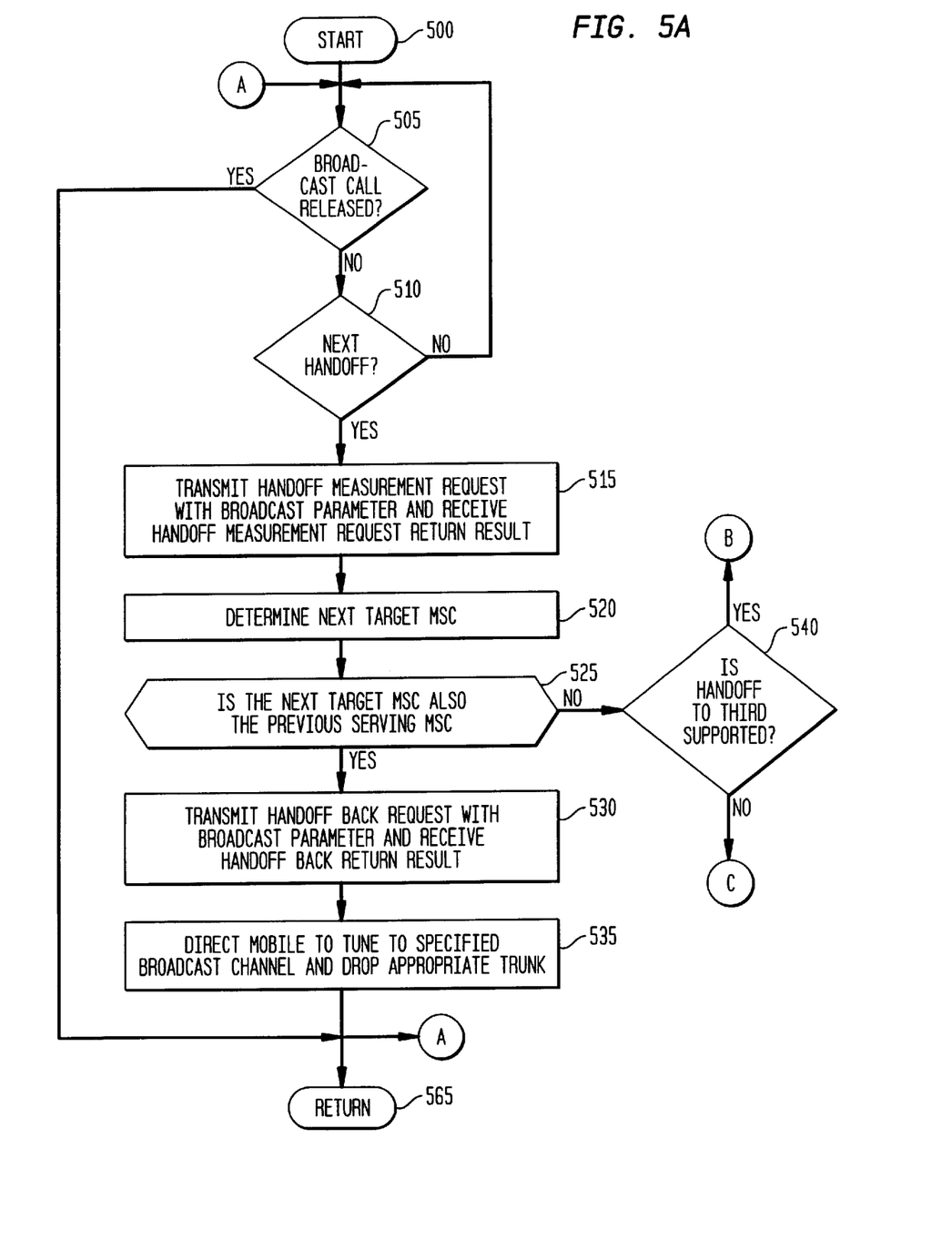
FIG. 5 is a flow diagram illustrating a secondary handoff and corresponding messaging in accordance with the present invention.
Figure 5B:
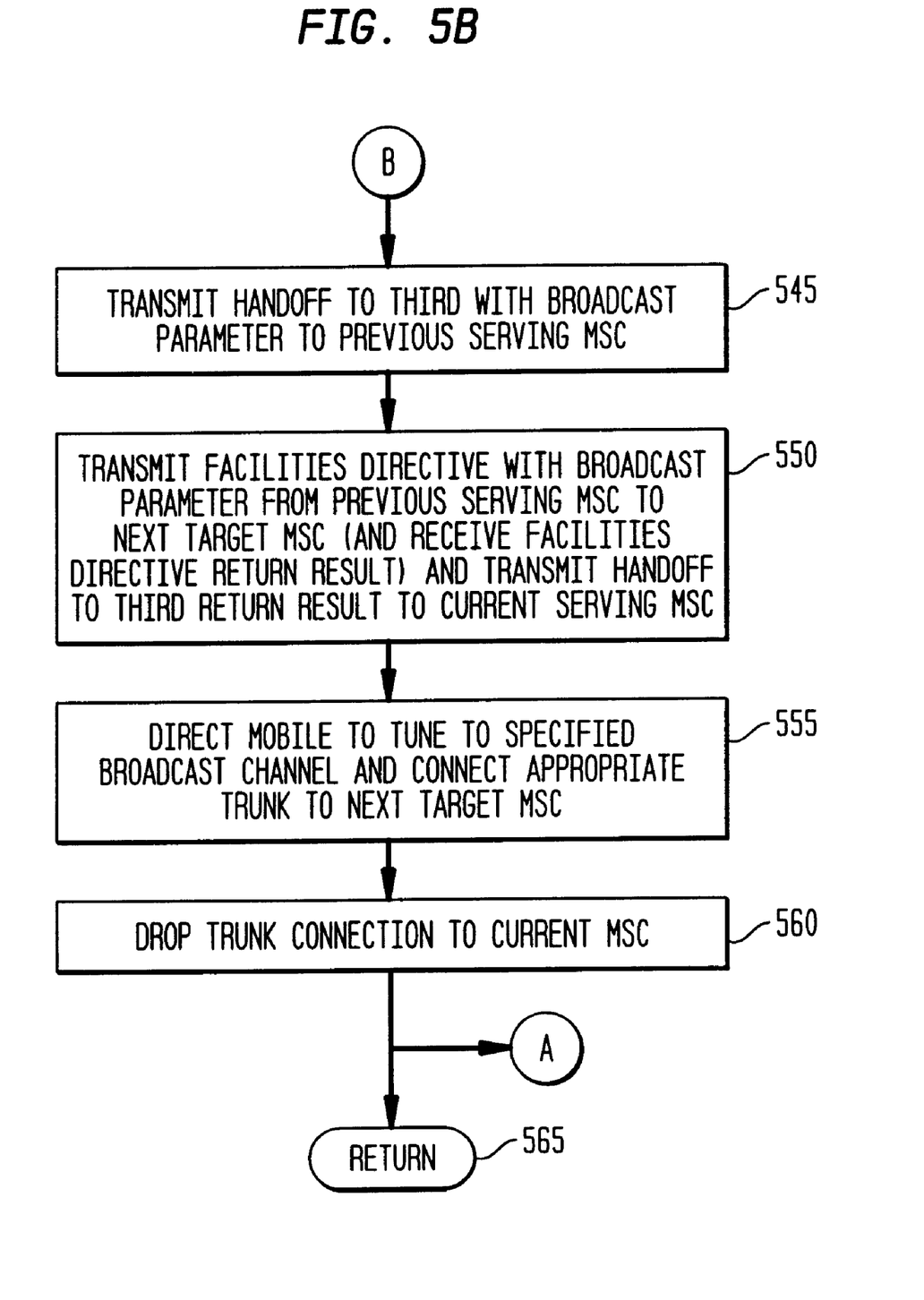

FIG. 4 is a flow diagram illustrating the hand-off procedures in accordance with the preferred method of the present invention. The method begins, start step 400, when the serving cell site (switch or transceiver) determines that the mobile signal (SAT or equivalent signal) of a mobile unit 140 (tuned to an information broadcast channel) is weaker or otherwise below a predetermined threshold value. As mentioned above, in the preferred embodiment, a new parameter, referred to herein as a "broadcast parameter", is utilized to designate that an information broadcast is to be handed off, to distinguish a broadcast handoff from a conventional communication session handoff. Also in the preferred embodiment, the broadcast parameter has the size of an octet (8 bits), which may be included as a new field within ANSI messages, and may have a value of zero to 255, with zero left unspecified and 1–255 designating a broadcast channel (one of which is to be handed off). The broadcast parameter identification may be encoded variously, for example, as a single, double or triple octet. In particular, as discussed in greater detail below, the broadcast parameter is utilized preferably in four types of ANSI messages, in which each message type appears in two forms, with the first form typically applicable to AMPS, NAMPS or TDMA, and with the second form typically applicable to CDMA or NAMPS MSs, as follows:

(1) Handoff Measurement Requests ("HandoffMeasurementRequest" and "HandoffMeasurementRequest2");

(2) Facilities Directives ("FacilitiesDirective" and "FacilitiesDirective2");

(3) Handoff Back ("HandoffBack" and "HandoffBack2"); and (4) Handoff to Third ("HandoffToThird" and "HandoffToThird2").

It should be noted, that as used herein, the two message forms (and corresponding return result message forms) are equivalent, with reference to one type meaning and including the other, and further including other similar message variations which may perform the same or similar functions.

Referring to FIG. 4, having determined that a handoff is desirable, in step 405, the serving cell site (i.e., serving MSC 110) transmits a request to surrounding cell sites (i.e., potential target MSCs 110), to determine the signal strength of that particular mobile unit 140, preferably utilizing an ANSI-compatible Handoff Measurement Request containing the broadcast parameter. The surrounding cell sites determine the signal strength of the particular mobile unit 140, and transmit (via respective MSCs 110) corresponding information about the signal strength to the serving cell site (MSC 110), preferably utilizing ANSI-compatible Handoff Measurement Request RETURN RESULT message. In other embodiments, step 405 may be replaced by the mobile unit 410 monitoring beacon channels of the surrounding cell sites or transceivers, followed by transmitting such information (such as an ordered list of signal strengths) to the serving cell site, or other methods of signal strength determination.

Next, the serving cell site (MSC 110) determines which, if any, surrounding cell sites (MSCs 110) should be selected as a target cell site for a hand-off, as the mobile unit 140 may be moving into the broadcast area of the target cell site, step 410. With regard to step 410, it should be noted that a potential target cell site (target MSC 110) may not necessarily support this broadcast feature. In such a case, in the preferred embodiment, such a cell site will not be selected as a target for a hand-off, with the serving site or serving transceiver retaining the broadcast to the particular mobile unit 140 until the signal degrades sufficiently and is dropped. Alternatively, when another potential target does support the broadcast feature, the serving cell site may target such a cell site or transceiver for hand-off of the mobile unit 140, even though the targeted site or transceiver would otherwise be sub-optimal for a typical hand-off. In the preferred embodiment, such a lack of support for this broadcast feature may be communicated in the corresponding return result messages, such as the HandoffMeasurementRequest RETURN RESULT or the FacilitiesDirective RETURN RESULT messages.

Continuing to refer to FIG. 4, when (and if) the serving cell site (serving MSC 110) has selected a target cell site (target MSC 110) for a hand-off, the serving cell site (MSC 110) transmits a directive to the selected, target cell site, informing the target of the impending hand-off, step 415, preferably utilizing an ANSI-compatible Facilities Directive ("FacilitiesDirective") containing the broadcast parameter. The target MSC 110 then determines what mobile channel (frequency, time slot or code assignment), such as mobile channel C, to which the mobile unit 140 should re-tune to receive the featured broadcast channel having information specific to the geographic region of the target cell site or sector, such as traffic information, and transmits the corresponding information to the serving cell site, preferably utilizing an ANSI-compatible Facilities Directive RETURN RESULT message.

Continuing to refer to FIG. 4, the serving cell site (MSC 110 via a transceiver 120) transmits a message to the mobile unit 140 to tune to the broadcast channel of the target cell site, step 420. The target cell site (MSC 110) also connects the appropriate trunk carrying the requested broadcast information, such as trunk D, to the corresponding mobile broadcast channel, such as mobile channel C. When the target cell site (via a transceiver 120) detects the mobile signal (SAT or equivalent) of the mobile unit 140, the target preferably also transmits a message to the serving cell site or transceiver that it (the target) is now serving the mobile unit. In the preferred embodiment, the formerly serving cell site or transceiver generates an accounting record, for subsequent use in billing or other subscriber accounting, and the initial hand-off portion of the method may end, return step 425. Preferably, the method may also proceed to monitor the broadcast for additional handoffs or release, as illustrated below with reference to FIG. 5 (flow diagram reference "A").

There are significant differences between this hand-off portion of the method of the present invention and known hand-off procedures. For example, for a typical bidirectional communication (such as for a mobile telephone conversation), a network trunk connection is maintained between the mobile channel and the other party to the call (which may be PSTN or another mobile); during a hand-off to a target cell site, another trunk connection is established and maintained between the serving and target cell sites to transfer the call and keep the call connected to the mobile unit in the new location. In contrast, because the information broadcast channel is a unidirectional communication (one-way broadcast) in accordance with the present invention, no such new trunk connection needs to be established or maintained between the serving and target cell sites.

In addition, in a typical bidirectional communication session of the prior art, the first serving cell site continues to be the control point for the communication session, and maintain the PSTN or other network connection for the duration of the session, regardless of the various hand-offs which may occur from cell to cell. In contrast, in accordance with the present invention, the control point changes from the serving cell to the target cell (and subsequent targets) as the mobile unit travels. As a consequence, if desired, when the hand-off has been completed (step 420, FIG. 4), the serving cell site is free to perform other activities, such as generating billing records or automatic message accounting ("AMA").

FIG. 5 is a flow diagram illustrating a secondary handoff and corresponding messaging in accordance with the present invention. As mentioned above, this portion of the method of the present invention typically begins, start step 500, after an initial handoff (following step 420, FIG. 4, reference "A"), and is utilized for subsequent handoffs and monitoring release of the broadcast. The method first determines whether the broadcast has been released, such as by the mobile unit going on hook, step 505. If the broadcast has been released, the method may end, return step 565. When the broadcast has not been released in step 505, the method determines whether a next handoff is necessary or advisable, step 510, such as by monitoring a SAT signal strength or monitoring a beacon signal. When a next handoff is not selected in step 510, the method returns to step 505 to continue to monitor the broadcast. When a handoff is selected in step 510, in step 515 (as in previous step 405) the current serving MSC 110 transmits a request to surrounding cell sites (i.e., potential next target MSCs 110), to determine the signal strength of that particular mobile unit 140, preferably also utilizing an ANSI-compatible Handoff Measurement Request containing the broadcast parameter. The surrounding cell sites determine the signal strength of the particular mobile unit 140, and transmit (via respective MSCs 110) corresponding information about the signal strength to the serving cell site (MSC 110), preferably also utilizing ANSI-compatible Handoff Measurement Request RETURN RESULT message. In step 520, a next target MSC is selected (also as in previous step 410).

The method then determines, in step 525, whether the next target MSC 110 is the same MSC 110 that was previously the serving MSC 110 (immediately prior to the handoff to the current serving MSC 110). When the next target MSC 110 was the previous serving MSC 110 in step 525, then handoff back methodology may be utilized, proceeding to step 530, discussed below. When the next target MSC 110 was not the previous serving MSC 110 in step 525, the method determines whether the system supports a handoff to third methodology, step 540. When a handoff to third methodology is supported in step 540, the method then proceeds to step 545, discussed below. When the next target MSC 110 is not the previous serving MSC 110 (in step 525), and when handoff to third methodology is not supported in step 540, the method may proceed to perform a broadcast handoff as discussed above, returning to step 415 (FIG. 4, flow diagram reference "C").

Continuing to refer to FIG. 5, when the next target MSC 110 was the previous serving MSC 110 in step 525, then handoff back methodology may be utilized, proceeding to step 530. In step 530, in lieu of a Facilities Directive, the current serving MSC 110 may transmit a Handoff Back ("HandoffBack") message containing a broadcast parameter to the next target (previous serving) MSC 110, and the next target (previous serving) MSC 110 transmits a Handoff Back RETURN RESULT message to the current serving MSC 110. The next target (previous serving) MSC 110 then determines what mobile channel (frequency, time slot or code assignment) to which the mobile unit 140 should re-tune to receive the featured broadcast channel having information specific to the geographic region of the target cell site or sector, such as traffic information, and transmits the corresponding information to the current serving MSC 110, preferably utilizing an ANSI-compatible Handoff Back RETURN RESULT message. The current serving MSC 110 (via a transceiver 120) transmits a message to the mobile unit 140 to tune to the broadcast channel of the next target cell site, step 435. The next target (previous serving) MSC 110 also connects the appropriate trunk carrying the requested broadcast information to the corresponding mobile broadcast channel. In addition, if any trunk connection had been established between the MSCs for the previous (initial) handoff, that trunk connection may be dropped, and the handoff method may end, return step 565. Again, in the preferred embodiment, the broadcast continues to be monitored for additional handoffs or release, returning to step 505 (flow diagram reference "A").

When the next target MSC 110 was not the previous serving MSC 110 in step 525, and when handoff to third methodology is supported in step 540, the method proceeds to step 545. In step 545, the current serving MSC 110 may transmit a Handoff to Third ("HandoffToThird") message, containing a broadcast parameter and identification of the next target MSC 110, to the previous serving MSC 110. The previous serving MSC 110, in step 550, transmits a Facilities Directive with a broadcast parameter to the next target MSC 110, which determines an appropriate broadcast channel and transmits a corresponding Facilities Directive RETURN RESULT to the previous serving MSC 110. The previous serving MSC 110 transmits a Handoff Back RETURN RESULT message to the current serving MSC 110, including a designation of the appropriate broadcast channel of the next target MSC 110. In step 555, the current serving MSC 110 directs the mobile unit 140 to tune (re-tune) to the specified broadcast channel, and the next target MSC 110 connects any appropriate broadcast channel trunk for communication with the mobile unit 140. Any trunk connection between the current serving MSC 110 and the previous serving MSC 110 may also be dropped, step 560, with any needed trunking maintained directly between the next target MSC 110 and the previous serving MSC 110. Following step 560, the method may end, return step 565, or again, in the preferred embodiment, the broadcast continues to be monitored for additional handoffs or release, returning to step 505 (flow diagram reference "A").

Numerous advantages of the present invention may be apparent from the above discussion. The apparatus, method and system in accordance with the present invention provide for mobile handoffs of broadcast information that is specific to a given geographic region and which may vary from region to region (or vary from sector to sector within a given region), such as traffic reports, sightseeing interests, public services information, weather conditions, or any other information specific to the local geographic region. Utilizing the specific handoff procedures of the present invention and the new broadcast parameter, as a mobile unit may traverse multiple geographic regions, the mobile unit may receive different and varied information during any particular broadcast session. When accessed, such information is broadcast to one or more mobile units over a shared broadcast channel, such as to cellular telephones, which are within a given region at any given time. In accordance with the preferred embodiment, such access and broadcast are user initiated, by the user dialing a specific sequence or number designated by the service provider for this particular type of service. In addition, the apparatus, method and system of the present invention are user friendly, user transparent, cost effective, and capable of implementation in existing communication systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for handoff of a mobile broadcast of information specific to a geographic region in a wireless communication system, the mobile broadcast on a first broadcast channel from a serving switch via a serving transceiver to a mobile unit, the method comprising:

(a) while the mobile broadcast on the first broadcast channel is in progress, the mobile broadcast comprising first information specific to a first geographic region of the serving transceiver and the serving switch, selecting a target switch with a target transceiver from a plurality of adjacent switches and transceivers;

(b) transmitting a handoff directive to the target switch, the handoff directive including a broadcast parameter designating the mobile broadcast;

(c) determining a second broadcast channel having an information broadcast feature, the second broadcast channel providing a second mobile broadcast comprising second information specific to a second geographic region of the target transceiver and the target switch;

(d) directing the mobile unit to the second broadcast channel; and (e) when a trunk connection has been established between the serving switch and the target switch for the handoff of the mobile unit, releasing the trunk connection.

2. The method of claim 1, wherein the broadcast parameter includes an eight bit designation of the first broadcast channel.

3. The method of claim 1, wherein the handoff directive is an ANSI-compatible Facilities Directive.

4. The method of claim 1, wherein the handoff directive is an ANSI-compatible Handoff Back.

5. The method of claim 1, wherein step (b) further comprises:

transmitting a handoff to third directive to a previous serving switch, the handoff to third directive designating the target switch and including the broadcast parameter;

transmitting, as the handoff directive, a facilities directive from the previous serving switch to the target switch, the facilities directive including the broadcast parameter.

6. The method of claim 5, wherein the handoff to third directive is an ANSI-compatible HandoffToThird.

7. The method of claim 1, further comprising:

monitoring a signal strength of the mobile unit.

8. The method of claim 7, wherein prior to step (a), further comprising:

when the signal strength of the mobile unit received by the serving transceiver is below a predetermined level, transmitting a measurement request to the plurality of adjacent switches and transceivers in a corresponding plurality of geographic areas to determine the signal strength of the first mobile unit, the measurement request including the broadcast parameter.

9. The method of claim 8, wherein the measurement request is an ANSI-compatible Handoff Measurement Request.

10. The method of claim 1, further comprising:

transmitting a message to the serving switch that the target switch is serving the mobile unit.

11. A system for handoff of a mobile broadcast of information specific to a geographic region, the mobile broadcast on a first broadcast channel from a serving switching center and a serving transceiver to a mobile unit, the system comprising:

a plurality of transceivers, the plurality of transceivers including the serving transceiver and a target transceiver; and a plurality of switching centers, the plurality of switching centers including the serving switching center and a target switching center, the serving switching center coupled to the serving transceiver and the target switching center coupled to the target transceiver, wherein the serving switching center includes instructions, while the mobile broadcast on the first broadcast channel is in progress, the mobile broadcast comprising first information specific to a first geographic region of the serving transceiver and the serving switching center, to select the target switching center from the plurality of switching centers and to transmit a handoff directive, the handoff directive including a broadcast parameter designating the mobile broadcast; wherein the target switching center includes instructions to determine a second broadcast channel having an information broadcast feature, the second broadcast channel providing a second mobile broadcast comprising second information specific to a second geographic region of the target transceiver and the target switching center; wherein the serving switching center includes further instructions, via the serving transceiver, to direct the mobile unit to the second broadcast channel; and when a trunk connection has been established between the serving switching center and the target switching center for the handoff of the mobile unit, the serving switching center including further instructions to release the trunk connection.

12. The system of claim 11, wherein the broadcast parameter includes an eight bit designation of the first broadcast channel.

13. The system of claim 11, wherein the handoff directive is an ANSI-compatible Facilities Directive transmitted to the target switching center.

14. The system of claim 11, wherein the handoff directive is an ANSI-compatible Handoff Back transmitted to a previous serving switching center of the plurality of switching centers.

15. The system of claim 11, wherein the serving switching center includes further instructions to transmit, as the handoff directive, a handoff to third directive to a previous serving switching center of the plurality of switching centers, the handoff to third directive designating the target switching center and including the broadcast parameter; and wherein the previous serving switching center includes instructions to transmit a facilities directive from the previous serving switch to the target switch, the facilities directive including the broadcast parameter.

16. The system of claim 15, wherein the handoff to third directive is an ANSI-compatible HandoffToThird.

17. The system of claim 15, wherein the handoff to third directive is an ANSI-compatible HandoffToThird.

18. The system of claim 11, wherein the serving switching center includes further instructions to monitor a signal strength of the mobile unit.

19. The system of claim 18, wherein the serving switching center includes further instruction, when the signal strength of the mobile unit received by the serving transceiver is below a predetermined level, to transmit a measurement request to the plurality of switching centers to determine the signal strength of the first mobile unit, the measurement request including the broadcast parameter.

20. The system of claim 19, wherein the measurement request is an ANSI-compatible Handoff Measurement Request.

21. The system of claim 11, wherein the target switching center includes further instructions to transmit a message to the serving switching center that the target switching center is serving the mobile unit.

22. The system of claim 11, wherein the serving switching center is further comprised of:

a network interface couplable to a plurality of trunk lines;

a memory, the memory storing a plurality of information broadcast features; and a processor coupled to the network interface and to the memory.

23. An apparatus for handoff of a mobile broadcast of information specific to a geographic region, the mobile broadcast on a first broadcast channel transmitted to a mobile unit from a serving switching center via a serving transceiver, the apparatus couplable via a plurality of trunk lines to a plurality of transceivers and to a plurality of switching centers, the apparatus comprising:

a network interface couplable to the plurality of trunk lines;

a memory, the memory storing a broadcast parameter; and a processor coupled to the network interface and to the memory, wherein the processor, when operative, includes program instructions, while the mobile broadcast on the first broadcast channel is in progress, the mobile broadcast comprising first information specific to a first geographic region of the serving switching center, to select a target switching center from a plurality of switching centers, to select a target transceiver from the plurality of transceivers, and to transmit a handoff directive, the handoff directive including a broadcast parameter designating the mobile broadcast; wherein the processor includes instructions to receive a designation of a second broadcast channel having an information broadcast feature, the second broadcast channel providing a second mobile broadcast comprising second information specific to a second geographic region of the target transceiver and the target switching center; wherein the processor includes further instructions to transmit via the network interface a direction to the mobile unit to the second broadcast channel; and when a trunk connection has been established, via a trunk line of the plurality of trunk lines, the trunk connection between the serving switching center and the target switching center for the handoff of the mobile unit, the processor including further instructions to release the trunk connection.

24. The apparatus of claim 23, wherein the broadcast parameter includes an eight bit designation of the first broadcast channel.

25. The apparatus of claim 23, wherein the handoff directive is an ANSI-compatible Facilities Directive transmitted by the processor, via the network interface, to the target switching center.

26. The apparatus of claim 23, wherein the handoff directive is an ANSI-compatible Handoff Back transmitted by the processor, via the network interface, to a previous serving switching center of the plurality of switching centers.

27. The apparatus of claim 23, wherein the processor includes further instructions to transmit via the network interface, as the handoff directive, a handoff to third directive to a previous serving switching center of the plurality of switching centers, the handoff to third directive designating the target switching center and including the broadcast parameter.

28. The apparatus of claim 23, wherein the processor includes further instructions to monitor a received signal strength of the mobile unit.

29. The apparatus of claim 28, wherein the processor includes further instruction, when the received signal strength of the mobile unit is below a predetermined level, to transmit via the network interface a measurement request to the plurality of switching centers to determine a corresponding plurality of signal strengths of the first mobile unit, the measurement request including the broadcast parameter.

30. The apparatus of claim 29, wherein the measurement request is an ANSI-compatible Handoff Measurement Request.

31. The apparatus of claim 23, wherein the apparatus is included within the serving switching center.

* * * * *